Feb. 15, 1966 J. D. SPERRY ETAL 3,235,200

TAPE TENSION DEVICE

Filed Aug. 23, 1963 2 Sheets-Sheet 1

JOHN D. SPERRY,
MARTIN SIEGEL &
DONALD B. MACLEOD
INVENTORS

BY Robert G. Clay

ATTORNEY

JOHN D. SPERRY,
MARTIN SIEGEL &
DONALD B. MACLEOD
INVENTORS

BY Robert S. Clay

ATTORNEY

United States Patent Office 3,235,200

Patented Feb. 15, 1966

3,235,200

TAPE TENSION DEVICE

John D. Sperry, Los Altos, Martin Siegel, San Mateo, and Donald B. MacLeod, Redwood City, Calif., assignors to Ampex Corporation, Redwood City, Calif., a corporation of California Filed Aug. 23, 1963, Ser. No. 304,168
9 Claims. (Cl. 242—75.44)

This invention relates to tape tensioning devices, particularly for use in magnetic tape transports.

Previously in the art, tape transports have been provided with devices for applying hold-back torque to a tape supply reel to tension the tape in the vicinity of the transducing heads against the pull of a capstan. The preservation of a desired level of tension is important in order to keep constant the wave-length of a signal recorded on the tape, for proper reproduction. Such devices have been controlled to vary the torque to compensate for changes in the tape tension and to thereby maintain the tension nearly constant. However tapes that have shrunk or stretched in storage, after being recorded, ought to be reproduced at different than the recording tensions, but such reproduction is not possible on machines of the prior art.

Also, in broad-band magnetic tape machines and particularly those used for television signal recording and reproduction, and more particularly in helical scan machines, each transverse track on the tape must be the same physical length at both recording and reproduction; otherwise "chomping" distortion of the television picture results.

Accordingly, it is an object of the present invention to provide a tape tensioning device in which a desired level of tension is automatically maintained, with the level being selectively variable.

It is another object of this invention to provide a device as above described and operable manually to vary the level of tension in a tape.

A device accomplishing these and other objects includes a solenoid coupled to a supply reel brake for engaging the brake with a force proportional to the current in the solenoid. A manually adjustable potentiometer is coupled to the solenoid to control the current and thus to set the tension level of the tape. A sensing arm engaging the tape relieves the load on the brake as a function of actual tension sensed, thus correcting transient tension changes and maintaining the level that was chosen.

A better understanding of the invention may be had by reference to the following description, taken in conjunction with the accompanying drawings, in which.

Figure 1:
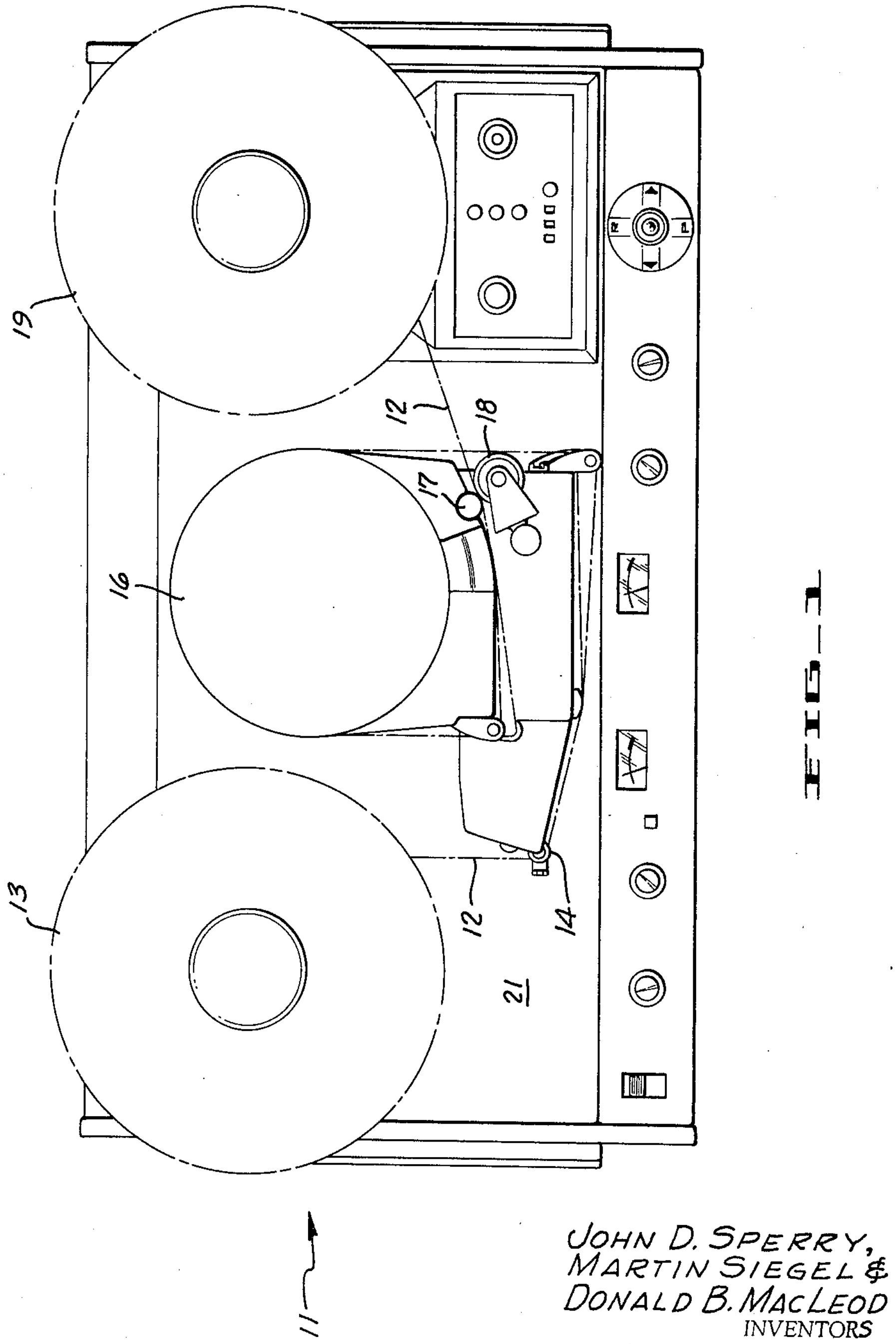
FIGURE 1 is a plan of a tape transport incorporating the present invention.

Referring now to the drawings and particularly to FIGURE 1, there is shown a magnetic tape transport 11, here shown as a helical scan television recording and reproducing machine. A magnetic tape 12 is withdrawn from a supply reel 13 and is guided over a sensing arm 14 and in a generally helical turn around a cylindrical scanning assembly 16 to a capstan 17 and pinch roller 18, and thence to a take-up reel 19.

Figures 2, 3:
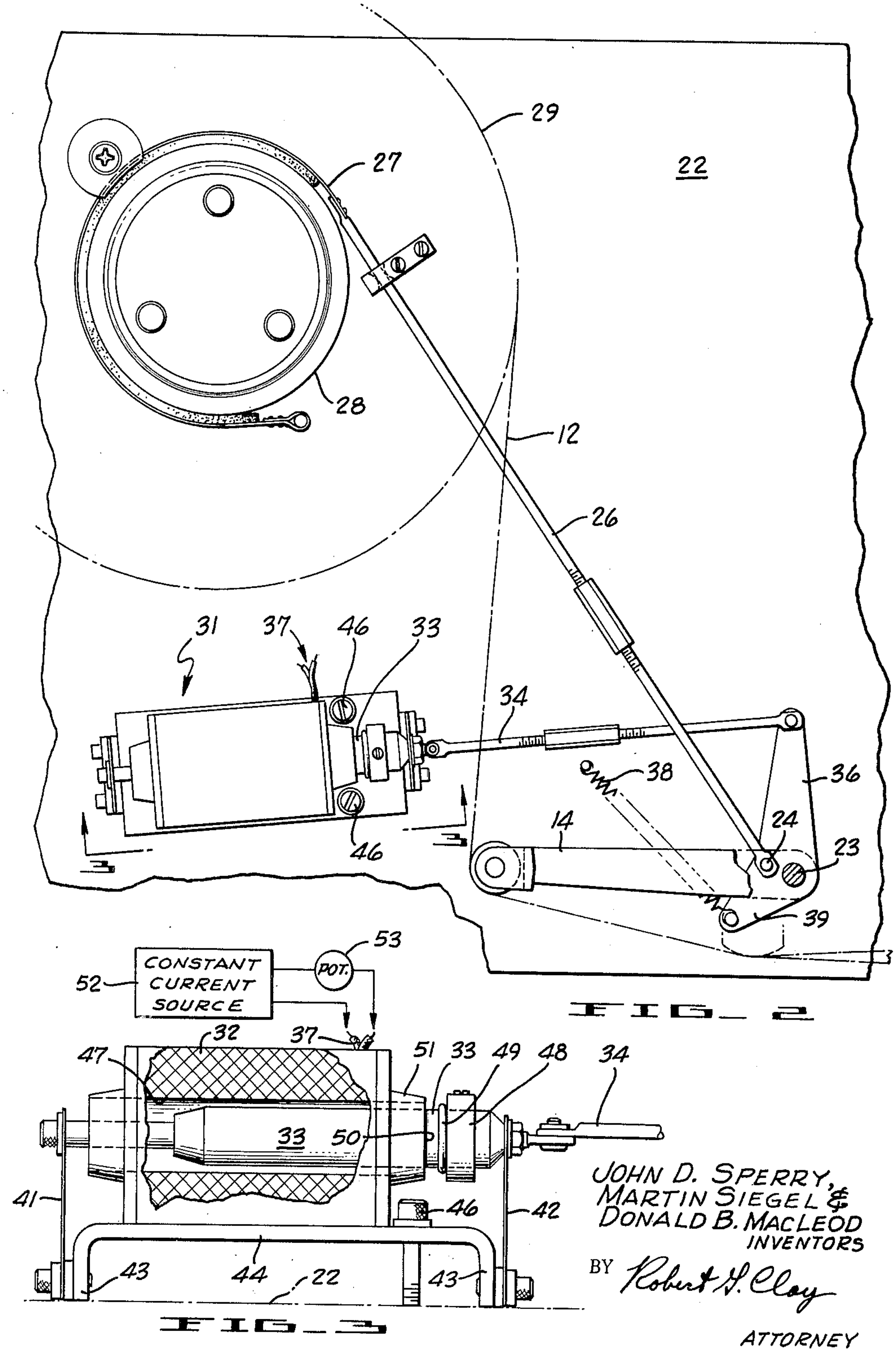
FIGURE 2 is an enlarged broken away plan of a portion of the apparatus shown in FIGURE 1.
FIGURE 3 is an enlarged broken away elevation taken on lines 3—3 of FIGURE 2.

The major portion of the inventive apparatus associated with the sensing arm is located beneath the top plate 21 of the transport, and is disposed as shown in FIGURE 2, mounted on a lower level mounting plate 22. The arm 14 is pivoted as by means of a shaft 23 journalled in the mounting plate 22, and is also coupled as by a pin 24 and link member 26 to the end of a brake band 27, the other end of the brake band being anchored. The arrangement is such that any increase of tension in the tape tends to cause the arm 14 to pivot in a clockwise direction, relieving the tension of the brake band 27 and its frictional engagement with a brake drum 28, which is coupled to the supply reel 13 and its tape pack 29. Such action of course tends to relieve the tension in the tape 12 and permit pivoting motion of the arm 14 in a counter-clockwise direction to tighten the brake band 27 and recover the tension of the tape.

For providing the basic tension, there is provided a solenoid 31 having a coil 32 and a plunger 33; and the plunger is coupled through a link member 34 to a secondary arm 36 that is coupled to the arm 14 and shaft 23. It will be seen when current is applied to the coil 32 as through electrical leads 37, then the plunger 33 is drawn toward the left, urging the arm 36 and arm 14 in a counterclockwise direction tending to tighten the brake band 27 on the drum 28. Thus it will be seen that the tape tension sensing arm 14 produces a force acting on the brake 27, 28 that is opposed to the force produced by the solenoid 31 and acting on the brake.

As shown in FIGURE 2, a tension spring 38 is also coupled to a sub-arm 39 that is coupled to the shaft 23, and tends to rotate the arms 14 and 36 in a clockwise direction. This spring 38, however, has slight force compared with the solenoid 31, and is used only for relieving the brake when the current to the solenoid is cut off.

As an important feature of the invention the solenoid is constructed so as to exert a constant pull on the plunger 33 and brake at a level corresponding to the value of the current in the coil 32. Referring to FIGURE 3, the plunger 33 is shown as supported in axial alignment with the coil 32 as by means of a pair of resilient spring leaves 41 and 42, the leaves 41, 42 being arranged to extend radially inwardly from the ends of legs 43 of a bracket 44 that is affixed to the body of the coil 32 and supports the coil. A pair of bolts 46 are used to couple the bracket 44 to the mounting plate 22. The important effect provided by the leaves 41, 42 is that they support the plunger 33 clear of the interior bore 47 of the coil 32, so that in moving in and out, the plunger does not have frictional engagement with the coil. The spring leaves 41, 42 have a spring force that is very slight compared to the coil 32, particularly in the neutral or non-spring-loaded position of the spring leaves 41, 42 illustrated in FIGURE 3. The plunger 33 has mounted thereon a stop collar 48 and a resilient O-ring 49 which engages a collar 51 of the coil 32 at the inward limiting position of the plunger 33, so as to prevent the plunger from being drawn too far into the coil 32 and damaging the spring leaves 41, 42. The inward end of the plunger is tapered as known in the art to ensure constant plunger force throughout the operating range of the plunger; and the midpoint of the operating range is inscribed on the plunger, as by a groove 50 opposite the orifice of collar 51.

As a further important feature of the invention, the general tenison level of the tape is established as by means of apparatus controlling the current through the coil 32. This apparatus is here shown as including a constant current source 52 coupled to the coil leads 37 through a manually adjustable potentiometer 53, as is well known in the art, for a particular setting of the potentiometer 53, the source 52 delivers a certain value of current to the coil 32, this current being unchanged in value no matter what stresses are placed upon the plunger 33 of the solenoid. To change the value of the current and the general tension level of the tape 12, it is only necessary to change the setting of the potentiometer 53.

With the solenoid as above constructed, it has been found in practice, that there is practically no oscillation whatsoever of the plunger when it is pulled out of the coil as by movement of the link member 34 to a new position. Within reasonable limits also, the strength of the pull exerted by the coil 32 upon the plunger 33 does not vary with change in the physical position of the plunger. In other words, the solenoid 31 exerts a substantially constant pull on the brake 27, 28, the strength of the pull being varied neither by changes in position of the arm 14 nor by oscillations of the plunger 33 in starting or stopping its movement.

It has also been found in practice, that the exact level of current needed for the coil 32 of the solenoid can be set by hand, while the operator is watching the screen of a television tube reproducing the signal that is read from the tape 12 by the scanning assembly 16.

Thus there has been described a device including a solenoid coupled to a supply reel brake for engaging the brake with a force proportional to the current in the solenoid. A manually adjustable potentiometer is coupled to the solenoid to control the current and thus to set the tension level of the tape. A sensing arm engaging the tape relieves the load on the brake as a function of actual tension sensed, thus correcting transient tension changes and maintaining the level chosen.

What is claimed is:

1. In a tape tensioning system including a supply reel and a brake therefor, the combination comprising:

electro-magnetic means for imposing a first force on said brake to place said tape under tension;

variable means for supplying current to said electro-magnetic means to establish said first force; and means for sensing the tension of said tape and developing a second force varying as a function of said tension;

said electro-magnetic means, said sensing means and said brake being coupled together with said first and second forces acting in opposition upon said brake.

2. In a tape tensioning system including a supply reel and brake therefor, the combination comprising:

a solenoid for imposing a first force on said brake to place said tape under tension, said solenoid including a coil and a plunger mounted for non-contacting movement with respect to said coil;

means for supplying current to said coil to develop said first force thereof at said plunger;

control means for varying said current to said coil for selectively varying said first force at said plunger; and means for sensing the tension of said tape and developing a second force varying as a function of said tension;

said plunger, said sensing means and said brake being coupled together with said first and second forces acting in opposition upon said brake.

3. In a tape tensioning system including a supply reel and brake therefor, the combination comprising:

a solenoid for imposing a first force on said brake to place said tape under tension, said solenoid including a cylindrical coil and a plunger mounted coaxially therein for axial movement with respect to said coil, a pair of flexible leaf elements, the ends of said plunger extending from said coil and being secured respectively to a first end of each of said leaf elements, the other end of each of said leaf elements being anchored so as to support said plunger in non-contacting relation to said coil while permitting said axial movement thereof;

means for suppling current to said coil to develop said first force thereof at said plunger;

control means for varying said current to said coil for selectively varying said first force at said plunger; and means for sensing the tension of said tape and developing a second force varying as a function of said tension;

said plunger, said sensing means and said brake being coupled together with said first and second forces acting in opposition upon said brake.

4. In a tape tensioning system including a supply reel and brake therefor, the combination comprising:

a solenoid for imposing a first force on said brake to place said tape under tension, said solenoid including a cylindrical coil, a mounting bracket engaging the side of said coil and having a pair of legs extending radially and axially away from said coil for anchoring said coil, a pair of flexible leaf elements mounted on and extending from the ends of said mounting bracket legs radially inward to the axis of said coil, a plunger mounted coaxially in said coil for axial movement with respect to said coil, the ends of said plunger extending from said coil and being secured to respective ones of said leaf elements, said leaf elements being aligned so as to support said plunger in non-contacting relation to said coil while permitting said axial movement thereof;

means for supplying current to said coil to develop said first force thereof at said plunger;

control means for varying said current to said coil for selectively varying said first force at said plunger; and means for sensing the tension of said tape and developing a second force varying as a function of said tension;

said plunger, said sensing means and said brake being coupled together with said first and second forces acting in opposition upon said brake.

5. In a tape tensioning system including a supply reel and brake therefor, the combination comprising:

a solenoid for imposing a first force on said brake to place said tape under tension, said solenoid including a cylindrical coil, a mounting bracket engaging the side of said coil and having a pair of legs extending radially and axially away from said coil for anchoring said coil, a pair of flexible leaf elements mounted on and extending from the ends of said mounting bracket legs radially inward to the axis of said coil, a plunger mounted coaxially in said coil for axial movement with respect to said coil, the ends of said plunger extending from said coil and being secured to respective ones of said leaf elements, said leaf elements being aligned so as to support said plunger in non-contacting relation to said coil while permitting said axial movement thereof;

a potentiometer;

a constant current source coupled to said coil through said potentiometer to develop said first force at said plunger, said potentiometer being adjustable to selectively vary the value of said current and the consequent valve of said first force at said plunger;

means for sensing the tension of said tape and developing a second force varying as a function of said tension;

said plunger, said sensing means and said brake being coupled together with said first and second forces acting in opposition upon said brake.

6. In a tape tensioning system including a supply reel and brake therefor, the combination comprising:

a solenoid for imposing a first force on said brake to place said tape under tension, said solenoid including a cylindrical coil, a mounting bracket engaging the side of said coil and having a pair of legs extending radially and axially away from said coil for anchoring said coil, a pair of flexible leaf elements mounted on and extending from the ends of said mounting bracket legs radially inward to the axis of said coil, a plunger mounted coaxially in said coil for axial movement with respect to said coil, the ends of said plunger extending from said coil and being secured to respective ones of said leaf elements, said leaf elements being aligned so as to support said plunger in non-contacting relation to said coil while permitting said axial movement thereof;

a potentiometer;

a constant current source coupled to said coil through said potentiometer to develop said first force at said plunger, said potentiometer being adjustable to selectively vary the value of said current and the consequent value of said first force at said plunger;

a tape tension sensing arm pivotably mounted for engaging said tape adjacent said supply reel and developing a second force varying as a function of said tension;

said plunger, said sensing arm and said brake being coupled together with said first and second forces acting in opposition upon said brake.

7. In a tape tensioning system including a supply reel and brake therefor, the combination comprising:

a solenoid for imposing a first force on said brake to place said tape under tension, said solenoid including a cylindrical coil, a mounting bracket engaging the side of said coil and having a pair of legs extending radially and axially away from said coil for anchoring said coil, a pair of flexible leaf elements mounted on and extending from the ends of said mounting bracket legs radially inward to the axis of said coil, a plunger mounted coaxially in said coil for axial movement with respect to said coil, the ends of said plunger extending from said coil and being secured to respective ones of said leaf elements, said leaf elements being aligned so as to support said plunger in non-contacting relation to said coil while permitting said axial movement thereof;

a potentiometer;

a constant current source coupled to said coil through said potentiometer to develop said first force at said plunger, said potentiometer being adjustable to selectively vary the value of said current and the consequent value of said first force at said plunger;

a tape tension sensing arm pivotably mounted for engaging said tape adjacent said supply reel and developing a second force varying as a function of said tension;

said brake including a brake drum coupled to said reel, a brake band looped around said drum and anchored at one end, the other end of said band being coupled to said sensing arm for at least partial relief of tension in said band upon development of said second force in one rotational direction of said arm, and said plunger being coupled to said arm for development of said first force in the opposite rotational direction of said arm and for thereby tensioning said band.

8. As a subcombination, a solenoid comprising:

a cylindrical coil;

a plunger mounted coaxially therein for axial movement with respect to said coil; and a first end of said plunger extending from said coil having only one first elongate flexible leaf element secured at a first end thereof firmly to said first end of said plunger and extending in only one radial direction from the axis of said plunger;

a second end of said plunger extending from said coil having only one second elongate flexible leaf element secured at a first end thereof firmly to said second end of said plunger and extending in only one radial direction from the axis of said plunger;

the second ends of both of said leaf elements being solidly anchored to provide a substantially parallelogram mounting for said plunger in said coil and permitting substantially unimpeded lengthwise movement of said plunger while confining said plunger to a predetermined substantially axial path in said coil, on which path said plunger has a substantially constant radial spacing from the encompassing portions of said coil.

9. As a subcombination, a solenoid comprising:

a cylindrical coil;

a mounting bracket engaging the side of said coil and having a pair of legs extending radially and axially away from said coil for anchoring said coil;

a pair of flexible leaf elements mounted on and extending from the ends of said mounting bracket legs radially inward to the axis of said coil;

a plunger mounted coaxially in said coil for axial movement with respect to said coil, the ends of said plunger extending from said coil and being secured to respective ones of said leaf elements, said leaf elements being aligned so as to support said plunger in non-contacting relation to said coil while permitting said axial movement thereof.

References Cited by the Examiner

UNITED STATES PATENTS

| | | | |
|---|---|---|---|
| 1,103,152 | 7/1914 | Morse | 242—75.44 |
| 2,102,761 | 12/1937 | Strobel | 317—191 X |
| 2,345,765 | 4/1944 | Michael | 242—75.51 X |
| 2,558,594 | 6/1951 | Tritle | 317—199 X |
| 2,858,487 | 10/1958 | Immel | 317—191 |
| 3,076,618 | 2/1963 | Van Hook | 242—75.42 |
| 3,169,215 | 2/1965 | Bliss | 317—186 X |

MERVIN STEIN, *Primary Examiner.*

STANLEY N. GILBREATH, *Examiner.*